(12) United States Patent
Walia et al.

(10) Patent No.: US 10,594,577 B2
(45) Date of Patent: Mar. 17, 2020

(54) SORTING AND DISPLAYING NETWORK TRAFFIC ANALYTICS

(71) Applicant: Cisco Technology, Inc., San Jose, CA (US)

(72) Inventors: Deven Walia, Punjab (IN); Rakesh B. Goudar, Cupertino, CA (US); Samar Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 15/831,668

(22) Filed: Dec. 5, 2017

(65) Prior Publication Data

US 2018/0176105 A1 Jun. 21, 2018

(30) Foreign Application Priority Data

Dec. 19, 2016 (IN) .............................. 201641043253

(51) Int. Cl.
*H04L 12/26* (2006.01)

(52) U.S. Cl.
CPC .......... *H04L 43/045* (2013.01); *H04L 43/062* (2013.01); *H04L 43/065* (2013.01); *H04L 43/0876* (2013.01); *H04L 43/14* (2013.01)

(58) Field of Classification Search
CPC ............... H04L 43/0823; H04L 43/065; H04L 43/0876; H04L 43/06; H04L 43/04; H04L 43/045; H04L 43/062; H04L 43/14; H04L 43/16; H04L 41/22

USPC ......................................................... 709/224
See application file for complete search history.

(56) References Cited

U.S. PATENT DOCUMENTS

| | | | |
|---|---|---|---|
| 6,182,097 B1 | 1/2001 | Hansen et al. | |
| 6,502,163 B1 * | 12/2002 | Ramankutty | G11C 15/00 365/49.17 |
| 8,301,645 B1 | 10/2012 | Crook | |
| 8,316,151 B1 * | 11/2012 | Ammundi | H04L 69/22 709/239 |
| 8,782,265 B1 * | 7/2014 | Bokotey | H04L 41/22 709/203 |
| 9,590,897 B1 * | 3/2017 | Faulk, Jr. | H04L 45/7453 |
| 2005/0027858 A1 | 2/2005 | Sloth et al. | |

(Continued)

*Primary Examiner* — Ruolei Zong
(74) *Attorney, Agent, or Firm* — Edell, Shapiro & Finnan, LLC

(57) ABSTRACT

A method including: in a network element that includes one or more hardware memory resources of fixed storage capacity for storing data used to configure a plurality of networking features of the network element and a utilization management process running on the network element, the utilization management process performing operations including: obtaining a plurality of entries of the one or more hardware memory resources representing utilization of the one or more hardware memory resources by network traffic passing through the network element; sorting the plurality of entries of the one or more hardware memory resources by statistics associated with the network traffic passing through the network element to produce sorted entries; and sending the extracted to a network management application for display is disclosed. An apparatus and one or more non-transitory computer readable storage media to execute the method are also provided.

20 Claims, 12 Drawing Sheets

(56) References Cited

U.S. PATENT DOCUMENTS

| | | | |
|---|---|---|---|
| 2006/0004956 A1* | 1/2006 | Madajczak | G11C 15/00 |
| | | | 711/108 |
| 2009/0198724 A1 | 8/2009 | Valimaki et al. | |
| 2010/0251128 A1 | 9/2010 | Cordasco | |
| 2012/0317276 A1 | 12/2012 | Muniraju | |
| 2014/0164595 A1* | 6/2014 | Bray | H04L 63/02 |
| | | | 709/224 |
| 2016/0359872 A1* | 12/2016 | Yadav | H04L 43/04 |
| 2017/0223105 A1* | 8/2017 | Johnsen | G06F 9/451 |

* cited by examiner

| IGRESS RESOURCES | | | | 300 | | |
|---|---|---|---|---|---|---|
| FEATURE | INST# | TCAM# | BANK# | FEATURE_ ENTRIES | FREE ENTRIES | PERCENT_ UTIL |
| RACL | 1 | 2 | 1 | 13109 | 8821 | 40.03 |
| VACL | 1 | 2 | 1 | 1867 | 8821 | 5.70 |
| PBR | 1 | 2 | 1 | 8108 | 8821 | 24.76 |
| QoS | 1 | 1 | 2 | 3823 | 28924 | 11.67 |
| COPP | 1 | 2 | 2 | 310 | 32310 | 0.95 |
| COPP | 2 | 2 | 2 | 310 | 32310 | 0.95 |
| WCCP | 1 | 2 | 1 | 835 | 8821 | 2.55 |
| FEX CONTROL | 1 | 2 | 1 | 4 | 8821 | 0.01 |
| FEX CONTROL | 2 | 2 | 1 | 4 | 32740 | 0.01 |

| EGRESS RESOURSES | | | | 320 | | |
|---|---|---|---|---|---|---|
| FEATURE | INST# | TCAM# | BANK# | FEATURE_ ENTRIES | FREE ENTRIES | PERCENT_ UTIL |
| RACL | 1 | 2 | 1 | 3 | 8821 | 0.01 |
| RACL | 2 | 2 | 1 | 3 | 32740 | 0.01 |
| VACL | 1 | 1 | 1 | 1867 | 30878 | 5.70 |
| VACL | 2 | 1 | 1 | 1867 | 30878 | 5.70 |
| NVE | 1 | 1 | 1 | 3 | 30878 | 0.01 |
| NVE | 2 | 1 | 1 | 3 | 30878 | 0.01 |
| NVE RDT | 1 | 1 | 1 | 1 | 30878 | 0.00 |
| NVE RDT | 2 | 1 | 2 | 1 | 28924 | 0.00 |

| TCAM Entries (Mod 5,Inst 0) | | 806 | 808 | 810 | 812 | 814 |
|---|---|---|---|---|---|---|
| Feature | Pkt_Type — 804 | Source IP/Mask | Dest IP/Mask | Action | ifindex | Stats |
| RACL | IPv4 | ip 209.165.201.3/27 | 209.165.202.131/27 | Permit | 0x1a200000 | 1531248034 |
| RACL | IPv4 | ip 209.165.201.2/27 | 209.165.202.132/27 | Permit | 0x1a200000 | 765624017 |
| RACL | IPv4 | ip 209.165.201.1/27 | 209.165.202.134/27 | Permit | 0x1a200000 | 765624017 |
| RACL | IPv4 | ip 209.165.201.2/27 | 209.165.202.131/27 | Permit | 0x1a200000 | 765624017 |
| RACL | IPv4 | ip 209.165.201.1/27 | 209.165.202.131/27 | Permit | 0x1a200000 | 382812009 |
| RACL | IPv4 | ip 0.0.0.0/0 | 0.0.0.0/0 | Deny | 0x1a201000 | 241001297 |
| RACL | IPv4 | ip 209.165.201.3/27 | 209.165.202.133/27 | Permit | 0x1a200000 | 76562402 |
| RACL | IPv4 | ip 209.165.201.1/27 | 209.165.202.132/27 | Permit | 0x1a200000 | 76562402 |
| RACL | IPv4 | ip 209.165.201.1/27 | 209.165.202.133/27 | Permit | 0x1a200000 | 76562402 |
| RACL | IPv4 | ip 209.165.201.3/27 | 209.165.202.132/27 | Permit | 0x1a200000 | 76562402 |
| RACL | IPv4 | ip 209.165.201.8/27 | 209.165.202.131/27 | Permit | 0x1a200000 | 76562402 |
| RACL | IPv4 | ip 209.165.202.132/27 | 209.165.201.2/27 | Permit | 0x1a201000 | 48731168 |
| RACL | IPv4 | ip 209.165.202.133/27 | 209.165.201.3/27 | Permit | 0x1a201000 | 48186974 |
| RACL | IPv4 | ip 209.165.202.131/27 | 209.165.201.2/27 | Permit | 0x1a201000 | 47334529 |
| QoS COPP | IPv4 | pim 0.0.0.0/0 | 209.165.202.135/27 | QoS | 0x0 | 17973 |
| QoS COPP | IPv4 | igmp 0.0.0.0/0 | 209.165.202.136/27 | QoS | 0x0 | 4319 |
| QoS COPP | ARP | arp-rarp/all ip 0.0.0.0/0 0.0.0.0/0 0000.0000.0000 | 0000.0000.00 | QoS | 0x0 | 15 |
| QoS COPP | IPv4 | udp 0.0.0.0/0 | 0.0.0.0/0 | QoS | 0x0 | 4 |
| VACL | IPv4 | icmp 0.0.0.0/0 | 0.0.0.0/0 | Permit | 0x0 | 0 |
| VACL | IPv4 | udp 0.0.0.0/0 | 0.0.0.0/0 | Permit | 0x0 | 0 |
| VACL | IPv4 | tcp 0.0.0.0/0 | 0.0.0.0/0 | Permit | 0x0 | 0 |
| VACL | IPv4 | tcp 0.0.0.0/0 | 0.0.0.0/0 | Permit | 0x0 | 0 |
| VACL | IPv4 | udp 0.0.0.0/0 | 0.0.0.0/0 | Permit | 0x0 | 0 |
| VACL | IPv4 | tcp 209.165.202.137/27 | 0.0.0.0/0 | Permit | 0x0 | 0 |
| VACL | IPv4 | tcp 209.165.202.137/27 | 0.0.0.0/0 | Permit | 0x0 | 0 |
| VACL | IPv4 | tcp 209.165.202.137/27 | 0.0.0.0/0 | Permit | 0x0 | 0 |
| VACL | IPv4 | tcp 209.165.202.137/27 | 0.0.0.0/0 | Permit | 0x0 | 0 |
| VACL | IPv4 | tcp 209.165.202.138/27 | 0.0.0.0/0 | Permit | 0x0 | 0 |
| VACL | IPv4 | udp 209.165.202.139/27 | 0.0.0.0/0 | Permit | 0x0 | 0 |

| TCAM Entries (Mod 5,Inst 0) | | Source IP/Mask | Dest IP/Mask | Action | ifindex | Stats |
|---|---|---|---|---|---|---|
| Feature | Pkt_Type | | | | | |
| RACL | IPv4 | ip 209.165.201.3/27 | 209.165.202.131/27 | Permit | 0x1a200000 | 1531248034 |
| RACL | IPv4 | ip 209.165.201.2/27 | 209.165.202.132/27 | Permit | 0x1a200000 | 765624017 |
| RACL | IPv4 | ip 209.165.201.1/27 | 209.165.202.134/27 | Permit | 0x1a200000 | 765624017 |
| RACL | IPv4 | ip 209.165.201.2/27 | 209.165.202.131/27 | Permit | 0x1a200000 | 765624017 |
| RACL | IPv4 | ip 209.165.201.1/27 | 209.165.202.131/27 | Permit | 0x1a200000 | 382812009 |
| RACL | IPv4 | ip 0.0.0.0/0 | 0.0.0.0/0 | Deny | 0x1a201000 | 241001297 |
| RACL | IPv4 | ip 209.165.201.3/27 | 209.165.202.133/27 | Permit | 0x1a200000 | 76562402 |
| RACL | IPv4 | ip 209.165.201.1/27 | 209.165.202.132/27 | Permit | 0x1a200000 | 76562402 |
| RACL | IPv4 | ip 209.165.201.1/27 | 209.165.202.133/27 | Permit | 0x1a200000 | 76562402 |
| RACL | IPv4 | ip 209.165.201.3/27 | 209.165.202.132/27 | Permit | 0x1a200000 | 76562402 |
| RACL | IPv4 | ip 209.165.201.8/27 | 209.165.202.131/27 | Permit | 0x1a200000 | 76562402 |
| RACL | IPv4 | ip 209.165.202.132/27 | 209.165.201.2/27 | Permit | 0x1a201000 | 48731168 |
| RACL | IPv4 | ip 209.165.202.133/27 | 209.165.201.3/27 | Permit | 0x1a201000 | 48186974 |
| RACL | IPv4 | ip 209.165.202.131/27 | 209.165.201.2/27 | Permit | 0x1a201000 | 47334529 |

FIG.8B

SORTING AND DISPLAYING NETWORK TRAFFIC ANALYTICS

PRIORITY CLAIM

This application claims priority to Indian Provisional Application No. 201641043253, filed Dec. 19, 2016, the entirety of which is incorporated herein by reference.

TECHNICAL FIELD

The present disclosure generally relates to computer network traffic analytics, and more particularly, to sorting and displaying the computer network traffic analytics.

BACKGROUND

End users have more communications choices than ever before. A number of prominent technological trends are currently afoot (e.g., more computing devices, more online video services, more Internet video traffic), and these trends are changing the network delivery landscape. One of these trends is the delivery of data to a user. For example, networking elements in a data center may obtain data about network traffic within the data center. A network manager may then analyze the obtained data to improve the performance of the data center.

BRIEF DESCRIPTION OF THE DRAWINGS

FIG. 3 shows simplified tables of data associated with determining analytics related to a network and to sort and filter the analytics, according to an example embodiment.

FIGS. 8A and 8B show simplified tables of sorted and filtered data associated with determining analytics related to a network, according to an example embodiment.

DESCRIPTION OF EXAMPLE EMBODIMENTS

Overview

Presented herein are techniques for sorting and filtering a plurality of entries for a plurality of networking features on a network element. The network element executes a traffic analytics process to obtain the plurality of entries of one or more hardware memory resources, which represent utilization of the one or more hardware memory resources by network traffic passing through the network element. The plurality of entries are then sorted by statistics associated with the network traffic passing through the network element to produce sorted entries. The extracted entries are then transmitted to a network management application, which displays the extracted entries.

Example Embodiments

Figure 1:
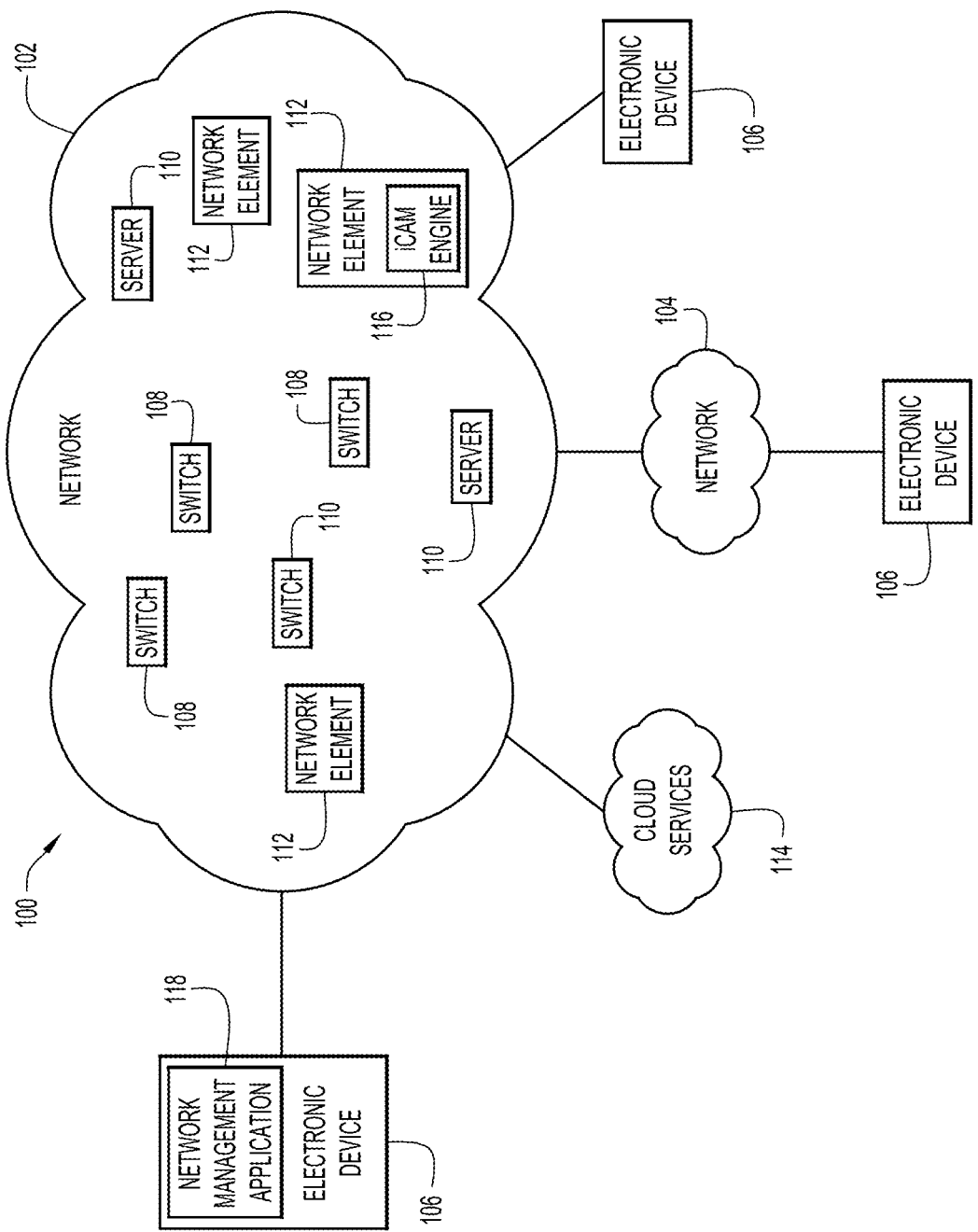
FIG. 1 is a simplified block diagram of a communication system in accordance with one embodiment of the present disclosure, according to an example embodiment.

With reference made first to FIG. 1, FIG. 1 is a simplified block diagram of a communication system 100 for determining analytics related to a network and for sorting, filtering, and displaying the analytics. Communication system 100 includes a network 102, a secondary network 104, a plurality of electronic devices 106, and cloud services 114. Network 102 includes a plurality of switches 108, a plurality of servers 110, and a plurality of network elements 112. Each of the plurality of network elements 112 may include an intelligent Content Addressable Memory (iCAM) engine 116 whose functionality is described in more detail below. The communication system 100 also includes a network management application 118 that may be used by a network to see display data related to operations on a network element or across multiple network elements in network 102, as well as configure network elements.

In an example implementation, switches 108, servers 110, and network elements 112 are network elements, which are meant to encompass network appliances, servers, routers, switches, gateways, bridges, load balancers, processors, modules, or any other suitable devices, components, elements, or objects operable to exchange information in a network environment, or any other type of network element (physical or virtual) now known or hereinafter developed. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

The electronic device 106 is any device that has network connectivity to the network 102, and is configured to use the network 102 to send and receive data. The electronic device 102 may be a desktop computer, laptop computer, mobile wireless communication device (e.g., cellphone or smartphone), tablet, etc. The server 110 may be a web server, application server, or any server configured to provide a service or function over the network 102 on behalf of one or more of the electronic devices. In an example, each electronic device 106 may request and receive data from cloud services 114 and/or server 110. Network element 112 may help facilitate the communication between electronic devices 106, cloud services 114, and server 110. To provide proper communication between the network elements of communication system 100, a network manager may determine the analytics of a network assisting with the network communications.

The iCAM engine 116 may be configured to determine and provide analytics related to the network 102 and to sort and filter the analytics. Said another way, iCAM engine 116 performs a utilization management process, and thus, the functions of iCAM engine 116 may be referred to herein as a utilization management process. More specifically, iCAM engine 116 may be configured to generate analytics related to usage of ternary content addressable memory (TCAM) in the network element 112 and provide a network manager with a relatively clear view of the TCAM resource utilization per networking feature, as well as how a networking configuration, such as access list entries, translates into hardware TCAM entries and which networking feature goes to which bank, how to optimize the access list entries, etc. The TCAM utilization data generated by the iCAM engine 116 may be sent, via network 102, to a network management application 118. A network manager may study the TCAM utilization data presented via the network management application 118 to determine how to effectively utilize the TCAM space and help properly configure the network 102 and allow proper communication between the network elements of communication system 100. As described in more detail, the iCAM engine 116 may analyze the TCAM utilization data to sort and filter the TCAM utilization data so that the TCAM utilization data may be presented to the network manager in a more easily understandable format. This may enable the network manager to change the configuration of the network element 112 to improve the performance of the network 102.

For purposes of illustrating certain example techniques of communication system 100, the following foundational information may be viewed as a basis from which the present disclosure may be properly explained.

Networking architectures continue to grow increasingly complex in communication environments. As the number of end users increases and/or becomes mobile, efficient management and proper routing of communication sessions and data flows becomes critical. One particular type of network where efficient management is crucial is data centers. Data centers serve a large portion of the Internet content today, including web objects (text, graphics, Uniform Resource Locators (URLs) and scripts), downloadable objects (media files, software, documents), applications (e-commerce, portals), live streaming media, on demand streaming media, and social networks.

The iCAM engine 116 may generate for network managers an overall view of how many entries of a hardware memory resource, such as TCAM or static random access memory (SRAM), are being used with respect to various networking features or combination of networking features. However, network managers often find it difficult to understand how to improve a configuration, especially for a data center. For example, for an access control list (ACL), some network managers do not have a clear overall view of the resource and how the access list entries translate into hardware TCAM entries, and more specifically, how the TCAM is utilized per feature such as Router-ACL (RACL), virtual local area network (VLAN)-ACL (VACL), Port-ACL (PACL), or a combination of RACL+VACL and many more L3/L2 ACL/Quality of Service (QoS) features. Moreover, it is useful to know which networking feature goes to which bank, how to optimize the access list entries, etc. Often, a network manager tries various combinations until they come up with a configuration that fits in the hardware. This can be time consuming and frustrating. As a result, some network managers may have difficulty determining which feature/combination is consuming more hardware resources and/or which TCAM/bank is loaded with more feature resources. Hence, there is a need for a system and method to determine analytics related to network elements in a network, and to sort and filter those analytics for improving the performance of the network elements in the network 102. When reference is made herein to determining analytics for a network, it is to be understood that this means determining analytics for one or more network elements in the network 102.

A communication system, as outlined in FIG. 1, may resolve these issues (and others). Communication system 100 may be configured to determine analytics related to the network 102, and to sort and filter the analytics. In a specific example, communication system 100 can be configured to include an iCAM engine (e.g., iCAM engine 116) on a supervisor engine (e.g., supervisor 202 shown in FIG. 2) or located in some other network element. The iCAM engine 116 may be configured to interact with various processes (e.g., driver software for a TCAM portion of a network) to collect the hardware resource utilization data. The hardware (memory) resource utilization data can be processed and sorted on a per feature basis. The processed and sorted hardware resource utilization data can be communicated to a network manager to provide analytics related to the network. The processed and sorted hardware resource utilization data may be communicated to a network manager to try and improve the performance of the network 102. The analytics may be used by the network manager to help determine how the configuration of the network may be improved, such as how access list entries translate into hardware TCAM entries and which feature goes to which bank, how to optimize the access list entries, etc.

As a result, network managers are able to receive a consolidated and clear view of how a configuration, such as access list entries, translate into utilization of hardware resources, that is the number of utilized TCAM entries, and which networking feature goes to which bank, how to optimize the access list entries, etc. Based on the feature resource usage, the network manager may attempt to effectively use the TCAM hardware space. The sorted hardware resource utilization data may also provide the network manager with an indication of which feature goes to which TCAM/bank, how each forwarding engine is loaded with features, total used and free entries per forwarding engine and TCAM/bank, and how the access list entries translate into hardware TCAM entries and other information or data that may help a network manager view or otherwise determine analytics related to the network 102 and improve the performance of the network 102. By standardizing Application Programming Interfaces (APIs) and associated messages, the same information may be leveraged across other networks. The above examples are only illustrative examples and other means or methods may be used to sort analytics related to a network.

Generally, communication system 100 may be implemented in any type or topology of networks. Network 102 represents a series of points or nodes of interconnected communication paths for receiving and transmitting packets of data that propagate through communication system 100. Network 102 may offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 102 may offer a communicative interface between nodes, and may be configured as a LAN, wireless LAN, home area network (HAN), near-me area network (NAN), personal area network (PAN), or some other similar network. Network 102 may include any number of hardware or software elements coupled to (and in communication with) each other through a communication medium. For example, network 102 may be a data center and iCAM engine 116 may help sort and filter the analytics of network 102. In another example, network 102 may include one or more platforms. The examples, particular arrangements, configurations, etc. described in the present disclosure can be applied to one or more networks or platforms.

In communication system 100, network traffic, which is inclusive of packets, frames, signals, data, etc., can be sent and received according to any suitable communication messaging protocols. Suitable communication messaging protocols may include a multi-layered scheme such as the Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

As used herein, a 'network element' is meant to encompass any of the aforementioned elements, as well as servers (physical or virtually implemented on physical hardware), machines (physical or virtually implemented on physical hardware), end-user devices, routers, switches, cable boxes, gateways, bridges, load-balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for determining analytics related to a network.

In one implementation, network elements implementing the determination/generation of analytics related to network features and the sorting and filtering of the analytics described herein may include software to achieve (or to foster) the functions discussed herein for providing and processing when the software is executed on one or more processors to carry out the functions. This could include the implementation of instances of modules (e.g., iCAM engine 116) and/or any other suitable element that would foster the activities discussed herein. Additionally, each of these elements can have an internal structure (e.g., a processor, a memory element, etc.) to facilitate some of the operations described herein. In other embodiments, these functions for the determination of analytics and recommendations based on the analytics may be executed externally to these elements, or included in some other network element to achieve the intended functionality. Alternatively, network elements may include software (or reciprocating software) that can coordinate with other network elements in order to achieve determination of analytics related to a network described herein. In still other embodiments, one or several devices may include any suitable algorithms, hardware, software, components, modules, interfaces, or objects that facilitate the operations thereof.

In regards to the internal structure associated with communication system 100, switches 108, servers 110, and network elements 112 are network elements may include memory elements for storing information to be used in the operations outlined herein. Switches 108, servers 110, and network elements 112 are network elements that may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the sorting and filtering system based on network analytics functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements 112, etc.) can include memory elements for storing information to be used in achieving the sorting and filtering system based on network analytics functions, as outlined herein. Additionally, each of these devices may include a processor that can execute software or an algorithm to perform the functions of as described herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this specification should be construed as being encompassed within the broad term 'processor.' Each of the network elements can also include suitable interfaces for receiving, transmitting, and/or otherwise communicating data or information in a network environment.

In an example implementation, network elements of communication system 100, such as switches 108, servers 110, and network elements 112 are network elements can be configured to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, switches 108, servers 110, and network elements 112 are network elements may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 106 may include user devices. Cloud services 114 may generally be defined as the use of computing resources that are delivered as a service over a network, such as the Internet. The services may be distributed and separated to provide required support for electronic devices. Typically, compute, storage, and network resources are offered in a cloud infrastructure, effectively shifting the workload from a local network to the cloud network. Server 110 may be a network element such as a physical server or virtual server and can be associated with clients, customers, endpoints, or end users wishing to initiate a communication in communication system 100 via some network (e.g., network 102). The term 'server' is inclusive of devices used to serve the requests of clients and/or perform some computational task on behalf of clients within communication systems 100.

Figure 2:
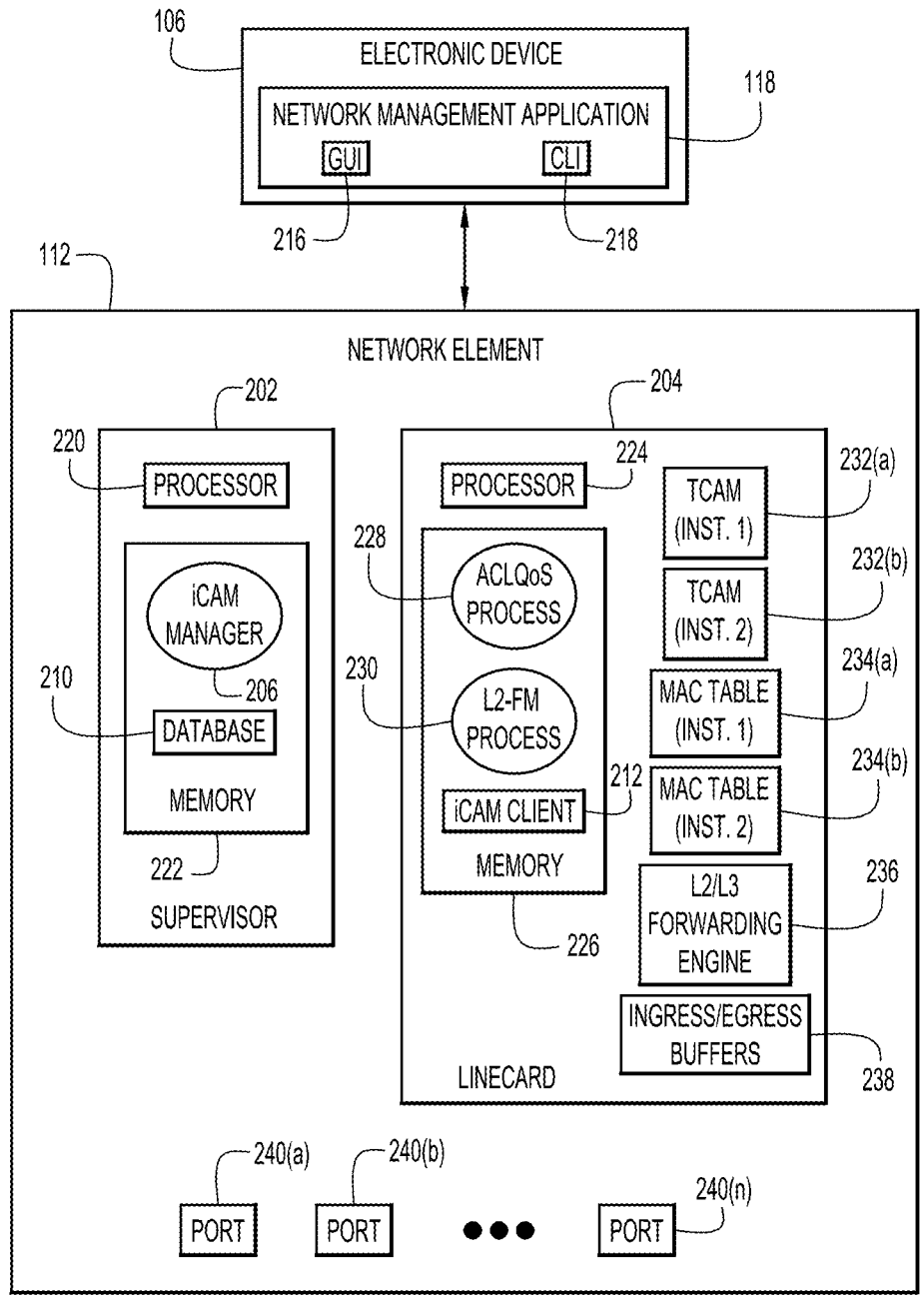
FIG. 2 is a block diagram of network element configured to generate, sort, and filter analytics related to utilization of a hardware memory resource of the network element, according to an example embodiment.

Turning to FIG. 2, network element 110 is shown in detail. Network element 110 may include a supervisor module/section 202 and a linecard 204. While one linecard 204 is shown in FIG. 2, it is to be understood that network element 112 may have multiple linecards. Supervisor 202 may include software for iCAM manager 206 and database 210. In an example, iCAM manager 206 may be located outside supervisor 202. The supervisor 202 includes a processor 220 and memory 222. The iCAM manager 206 and database 210, in one form, are embodied by instructions stored in memory 222 and executed by the processor 220. The processor 220 may be embodied by one or more microprocessors or microcontrollers.

Linecard 204 can include a processor 224 and memory 226. Software instructions for an iCAM client 212, ACLQoS process 228, and a L2-FM process 230 are stored in memory 226. Linecard 204 can also include TCAMs 232(a) and 232(b) and Media Access Control (MAC) tables 234(a) and 234(b).

There are also a plurality of ports 240(a)-240(n) at which ingress traffic is received at the network element 112 and from which egress traffic is sent.

The ACLQoS process 228 communicates with a Layer 3 driver to program hardware resources for Layer 3 and Layer 2 classification-based security policies like RACL, VACL, PACL, PBR, QoS, etc. The L2-FM process 230 may include software that communications with a Layer2 driver to learn and program the MAC address tables 234(a) and 234(b).

The linecard 204 can also include an L2/L3 Forwarding Engine 236 with the TCAMs 232(a) and 232(b) and Ingress/Egress Buffers 238. These components may be embodied as a System On Chip (SOC). There can be multiple SOCs. The TCAMs 232(a) and 232(b) stored data in entries that specify match criteria for networking features to be performed for packets that meet the match criteria.

In an example, iCAM manager 206 can be configured to interact with various component/functions on linecard 204 (e.g., ACLQoS process 228, and L2-FM process 230) via the iCAM client 212 to collect hardware resource utilization data and statistics associated with traffic passing through the network element. iCAM manager 206 can also be configured to analyze the data and communicate a summarized output as well as sorting and/or filtering the data. For example, the sorted and/or filtered output may be one or more tables displayed on a screen by the network management application 118 for viewing by a network manager.

In a specific example, iCAM manager 206 can be configured to send a messaging and transaction service (MTS) message to ACLQoS process 228 and L2-FM process 230 on all the linecards for which the data is requested. ACLQoS process 228 can collect hardware resource utilization data for the virtual device contexts (VDCs) and destinations per feature. The data can be used to populate an iCAM data structure and ACLQoS process 228 can reply back with the MTS payload to iCAM manager 206. iCAM manager 206 can receive the data from the iCAM client 212 and create a formatted output to help a network manager get a quick overview of the resource utilization per feature. Moreover, iCAM manager 206 can receive the data and create a formatted output to help the network manager get a quick overview of the changes to the network that can improve the performance of the network.

The network element 112 may communicate with a graphical user interface (GUI) 216 and a command line interface (CLI) 218. In an example embodiment, the GUI 216 and CLI 218 may be located remote from the network element 112 in which the iCAM manager 206 is stored. For example, the GUI 216 and CLI 218 may be a part of the network management application 118.

Turning now to FIG. 3, further details of the hardware memory resource utilization for various networking features are now described. FIG. 3 illustrates simplified tables of data generated by iCAM engine 116 that may be associated with sorting and filtering analytics related to a network, in accordance with an embodiment.

Referring to FIG. 3, with continued reference to FIG. 2, a table is shown containing hardware memory resource (e.g., TCAM) utilization for a network element on which a plurality of networking features are configured, including RACL, VACL, Policy-Based Routing (PBR), QoS, Control Plane Policing (CoPP), Web Cache Communication Protocol (WCCP, a content-based routing technology developed by Cisco Systems, Inc.), Fabric Extender Control (FEXControl, an extensible and a scalable fabric technology developed by Cisco Systems, Inc.), and Network Virtual Endpoint (NVE). Table 300 shows utilization data of the ingress resources (Ingress Resources) and table 320 shows utilization data of the egress resources (Egress Resources). For each of the features listed, the tables 300 and 320 include a column/field for each of: instance number (Inst#) indicating the System on a Chip (SOC) number (there may be multiple SOC/forwarding engines per linecard), TCAM# indicating which particular TCAM instance that feature is using, Bank# indicating which bank that feature is using, Feature_Entries indicating how many TCAM entries that feature is using, Free Entries indicating how many free entries there are from that feature, and Percent_Utilization (Percent_Util) indicating how much of a TCAM that particular feature is using. For example, for the networking feature RACL usage of the Ingress Resources as shown in table 300, it is using TCAM 2, Bank 2, occupies 13109 entries in TCAM 2, has 8821 free entries, and is using 40.03 percent utilization of TCAM 2. Similarly, for networking feature RACL usage of the Egress Resources as shown in table 320, it is using TCAM 2, Bank 1, 3 entries in TCAM 2, has 8821 free entries, and a 0.01 percent utilization of TCAM 2.

While tables 300 and 320 show a small number of entries, in practice the tables 300 and 320 may have hundreds, thousands, or even more entries. Due to the number of entries, a network manager may have difficulty determining which features are using the most entries and/or which features are using the fewest, if any, entries. For example, if the RACL feature is being heavily utilized, the network performance may be improved if the RACL feature had more feature entries in the TCAM. Therefore, a network manager may want to know which entries are not being heavily used, such as, for example, COPP, and reassign one or more of the hardware resources associated with COPP to RACL. Sorting the entries enables the network manager to perform such reassignments.

However, conventionally sorting the TCAM entries may be prohibitively time consuming, yet, stably sorting the TCAM entries can be beneficial to a network manager. The TCAM entries include network statistics as well as an index associated with each entry. Stably sorting the TCAM entries means that as the entries are sorted, the associated index for each entry remains associated with the entry.

The iCAM manager 206 may cause the database 210 to store TCAM data and user inputs in a number of data structures. For example, a first data structure may include user request parameters, which may be received from the CLI 218. The user request parameters may include a percentage of entries requested, such as the top 20% of entries or the bottom 10% of entries, an order in which the entries should be sorted, such as in ascending or descending order, and a feature to be filtered, such as RACL. This can be referred to by 3-tuple [k %, Order, Filter]. A second data structure may be two dimensional and may be used to store the statistics of the TCAM entries in a first dimension. The second data structure may also include two pointers. The first pointer may point to an array which stores the unsorted and unfiltered statistics, herein referred to as the arr_in array. The second pointer may point to an array which stores the sorted and, if applicable, filtered statistics, herein referred to as the arr_top array. The second dimension includes an original index value associated with each of the statistics. A third data structure may be used to store other attributes associated with the statistics, such as feature name, class type, value mask, action, and Interface (IF) index.

Figure 4A:
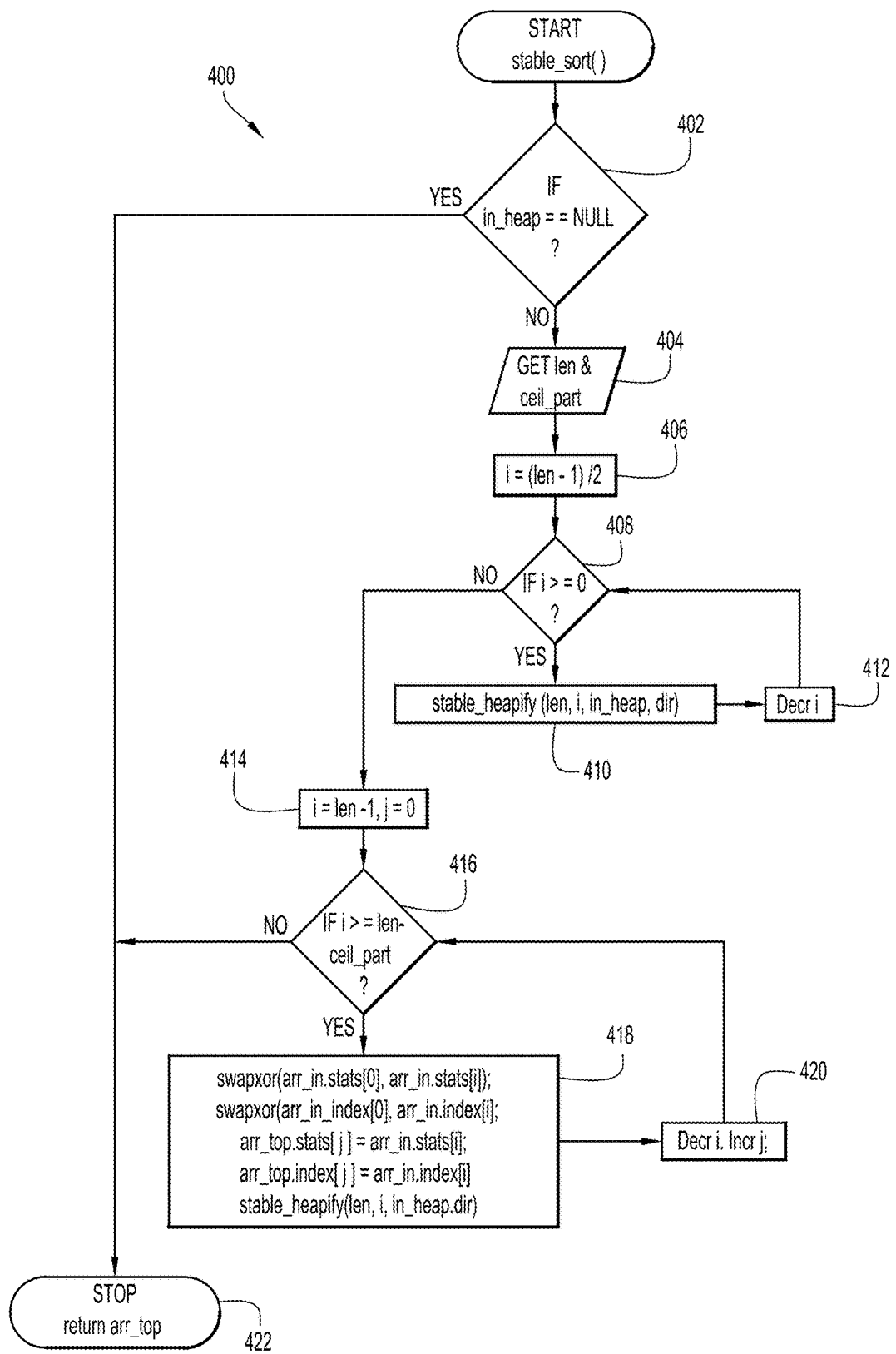
FIGS. 4A and 4B level flowcharts illustrating a method for stably sorting entries in ternary content addressable memory (TCAM), according to an example embodiment.
Figure 4B:
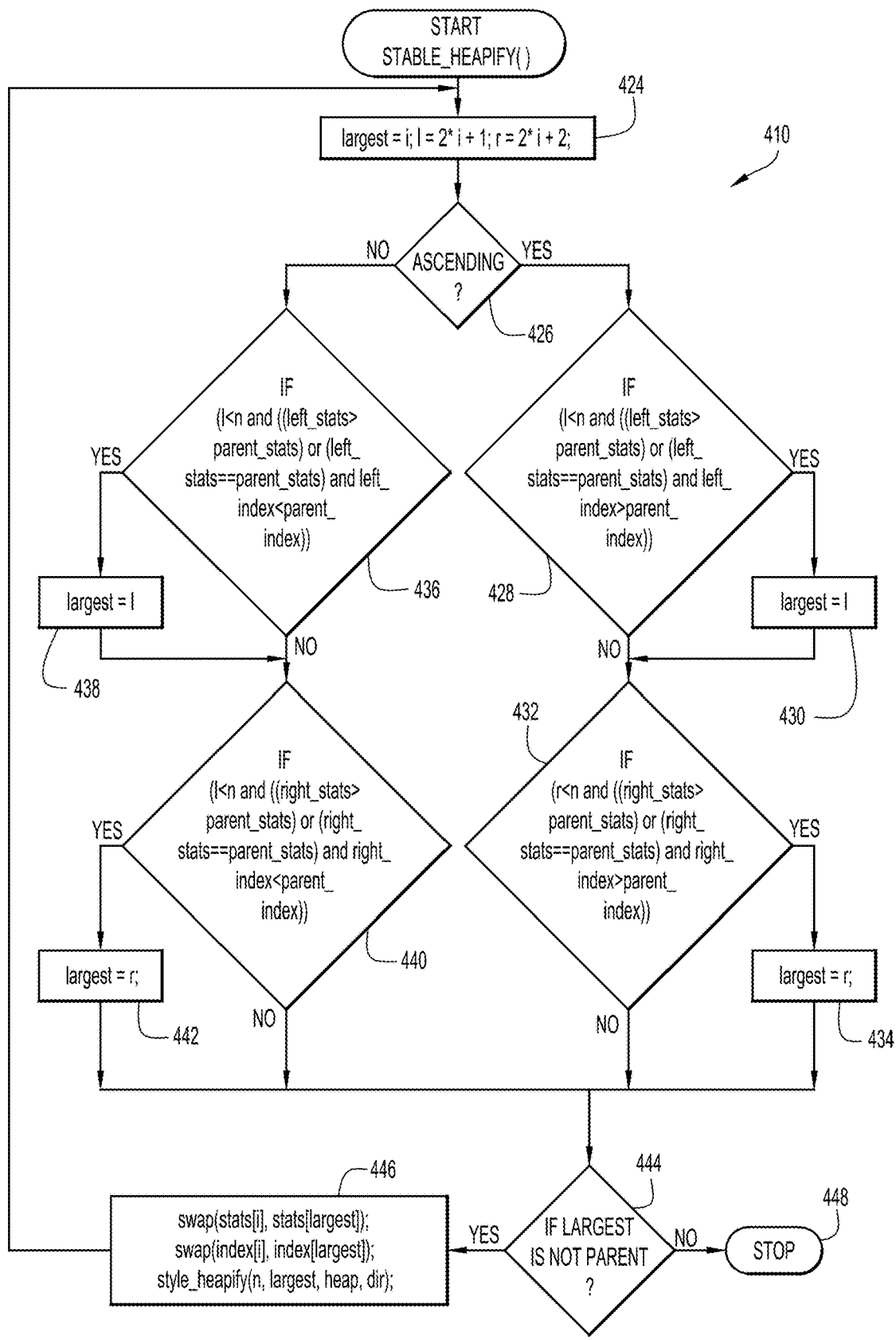

Turning to FIGS. 4A and 4B, shown are flowcharts illustrating a method for stably sorting the TCAM entries, according to an example embodiment. Taken together, FIGS. 4A and 4B depict a stable heapsort process. Additionally, the runtime for the stable heapsort is O(n log(n)), where n is the number of entries. Therefore, the stable heapsort shown in FIGS. 4A and 4B is also not prohibitively time consuming. The flowcharts show in FIGS. 4A and 4B may operate on the three data structures described above. The method 400 begins at operation 402. At operation 402, the iCAM manager 206 determines if any entries are stored in the arr_in array. In other words, the iCAM manager 206 determines if there are any unsorted and unfiltered stored TCAM entries. If the arr_in array does not contain any entries, then the method 400 proceeds to operation 422 and the method 400 ends. However, if the arr_in array does contain entries, then the method 400 proceeds to operation 404.

At operation 404, the iCAM manager 206 initiates two variables: len and ceil_part. The len variable is the number of entries that are stored in the arr_in array. The len variable is initialized to this value. The ceil_part variable is an integer that is equal to k % len+1. As described above, k is the percentage of entries in the arr_in array the user requested. For example, if the user requested the top 10% of entries, and the len variable was determined to be 106, then ceil_part would equal 11 (10% 106+1). The variable ceil_part corresponds to the number of entries to be extracted from the sorted arr_in array. After operation 404 is complete, the method proceeds to operation 406.

At operation 406, the iCAM manager 206 may initiate another variable: i. The variable i is equal (len−1)/2. The variable i is used as an index in the flowchart shown in FIG. 4B, as described in more detail below. The variable i also serves as a counter for a number of times to run the stable_heapify function shown in FIG. 4B. After operation 406 is complete, the method 400 proceeds to operation 408.

At operation 408, the iCAM manager 206 determines if the variable i is greater than or equal to 0. If it is not, in other words, if i is a negative value, then the method 400 proceeds to operation 414. If the variable i is greater than or equal to 0, than the method 400 proceeds to operation 410.

At operation 410, the iCAM manager 206 calls the stable_heapify function (shown in FIG. 4B). This operation will described in greater detail with reference to FIG. 4B. After operation 410 is complete, the method 400 proceeds to operation 412.

At operation 412, the iCAM manager 206 decrements the value of the variable i. After operation 412 is complete, the method 400 returns to operation 408.

After the loop defined by operations 408, 410, and 412 is complete, the variable i has a negative value and the method will then proceed from operation 408 to operation 414. This also indicates that the entries in the arr_in array satisfy heap properties. At operation 414, the iCAM manager 206 assigns the variable i a value of len−1. The iCAM manager 206 also initiates variable j, which is assigned a value of 0. The variables i and j are index values of the sorted arr_in array. After operation 414 is complete, the method 400 proceeds to operation 416.

At operation 416, the iCAM manager 206 determines if the value of variable i is greater than or equal to the value of len-ceil_part. This determination prevents the method from extracting more entries from the sorted arr_in array than is requested by the user. Therefore, this determination prevents wasted clock cycles. If the value of variable i is less than that difference, then the method proceeds to operation 422 and terminates. However, if the value of variable i is greater than or equal to that difference, then the method 400 proceeds to operation 418.

At operation 418, the iCAM manager 206 performs several functions. First, the value of the statistic in the arr_in array at index 0 is swapped with the value of the statistic in the arr_in array at index i. For example, if the user requested the statistics to be sorted in ascending order, the value of the statistic in the arr_in array at index 0 will contain the highest value in the arr_in array. This swap moves this highest value statistic to index i in the arr_in array. In addition to swapping the value at these indices, the original indices associated with the values are also similarly swapped. These swaps may be performed in any suitable manner. In one example, an XOR swap may be performed.

After these swaps have been performed, the array arr_top may be populated with both the statistics and index of the swapped values. For example, the value of the statistic in the array arr_top at index 0 is assigned the value of the statistic in the array arr_in at index i, which now contains the highest value in the array arr_in. Moreover, the value of the index in the array arr_top at index 0 may be assigned the value of the index in the array arr_in at index i. The changes to the array arr_in may cause arr_in no longer to satisfy heap properties. Therefore, the stable_heapify function is called to ensure that the arr_in array satisfies the heap properties before the arr_top array continues to be populated. After operation 418 is complete, the method 400 proceeds to operation 420.

At operation 420, the iCAM manager 206 decrements the value of variable i and increments the value of variable j. This enables the next index location of array arr_top to receive the second highest value in the array arr_in. After operation 418 is complete, the method proceeds to operation 416 again.

After the loop defined by operations 416, 418, and 420 is complete, the method proceeds to operation 422, which returns the array arr_top and terminates the method 400. The array arr_top now has the statistics requested by a network manager.

Turning to FIG. 4B, shown is a high-level flowchart for the stable_heapify method/function 410, according to an example embodiment. The stable_heapify method 410 orders the values in the array arr_in so that they satisfy heap properties in a stable manner. In other words, the stable_heapify method 410 generates a heap of the data in the array arr_in while maintaining an association of the data to their respective original indices. The stable_heapify method 410 begins at operation 424. At operation 424, the iCAM manager 206 initiates three variables: largest, l, and r. The variables largest, l, and r are indices used for generating the heap. The variable largest is initialized to the value of variable i, which was generated and described above in regards to operation 406. The variable largest points to a parent node within the heap. The variable l is equal to 2*i+1 while the variable r is equal to 2*i+2. The variable l points to the left child of the parent i while the variable r points to the right child of the parent i. After operation 424 is complete, the stable_heapify method 410 proceeds to operation 426.

At operation 426, the iCAM manager 206 determines whether the heap should be sorted in an ascending or descending order. As described above, one of the data structures may include the parameters requested by the user, including the order of the sort. If the user requested the sort parameter in an ascending order, the stable_heapify method 410 proceeds to operation 428. If the user requested the sort parameter in a descending order, the stable_heapify method 410 proceeds to operation 436. The stable_heapify method 410 will be first described with respect to an ascending order.

At operation 428, the iCAM manager 206 determines a status of several relationships. First, the iCAM manager 206 determines whether the value of variable l is less than the total number of entries (n) within the heap. If that is true, and the value of the statistic contained at index l is greater than or equal to the value of the statistic contained at the parent node, i.e., the variable i, and the value of the variable l itself is greater than the value of the variable i itself, then the iCAM manager 206 assigns the value of l to the variable largest, as shown at operation 430. The stable_heapify method 410 proceeds from operation 430 to operation 432. On the other hand, if the relationship determined in operation 428 is not true, the stable_heapify method 410 proceeds from operation 428 to operation 432.

At operation 432, the iCAM manager 206 determines a status of several other relationships. First, the iCAM manager 206 determines whether the value of variable r is less than the total number of entries (n) within the heap. If that is true, and the value of the statistic contained at index r is greater than or equal to the value of the statistic contained at the parent node, i.e., the variable i, and the value of the variable r itself is greater than the value of the variable i itself, then the iCAM manager 206 assigns the value of r to the variable largest, as shown at operation 434. The stable_heapify method 410 proceeds from operation 434 to operation 444. On the other hand, if the relationship determined in operation 432 is not true, the stable_heapify method 410 proceeds from operation 432 to operation 444.

If the user requested the statistics in a descending order, as determined at operation 426, the stable_heapify method 410 proceeds from operation 426 to operation 436. At operation 436, the iCAM manager 206 determines a status of several relationships. First, the iCAM manager 206 determines whether the value of variable l is less than the total number of entries (n) within the heap. If that is true, and the value of the statistic contained at index l is greater than or equal to the value of the statistic contained at the parent node, i.e., the variable i, and the value of the variable l itself is less than the value of the variable i itself, then the iCAM manager 206 assigns the value of l to the variable largest, as shown at operation 438. The stable_heapify method 410 proceeds from operation 438 to operation 440. On the other hand, if the relationship determined in operation 436 is not true, then stable_heapify method 410 proceeds from operation 436 to operation 440.

At operation 440, the iCAM manager 206 determines a status of several other relationships. First, the iCAM manager 206 determines whether the value of the variable r is less than the total number of entries (n) within the heap. If that is true, and the value of the statistic contained at index r is greater than or equal to the value of the statistic contained at the parent node, i.e., the variable i, and the value of the variable r itself is less than the value of the variable i itself, then the iCAM manager 206 assigns the value of r to the variable largest, as shown at operation 442. The stable_heapify method 410 proceeds from operation 442 to operation 444. On the other hand, if the relationship determined in operation 440 is not true, the stable_heapify method 410 proceeds from operation 440 to operation 444.

At operation 444, the iCAM manager 206 determines if the value of the variable largest has changed. In other words, if the value of the variable largest is no longer equal to i, due to determinations made at operations 428, 432, 436, and/or 440, then the stable_heapify method 410 proceeds to operation 446. However, if the value of the variable largest is still equal to i, then the stable_heapify method 410 proceeds to operation 448 and terminates.

At operation 446, the iCAM manager 206 swaps statistics and the associated original indices. For example, the statistic at the parent index (i) is swapped with the statistic at index largest. Additionally, the original index associated with the statistic at the parent index (i) is swapped with the original index associated with the statistic at the index largest. After this swap is completed, a recursive call to the stable_heapify method 410 is called. After operation 446 is complete, the method 410 proceeds to operation 424.

By the method described in FIGS. 4A and 4B, the TCAM data or statistics may be sorted in ascending or descending order, and the user requested number of entries may be extracted from the heap. The original indices, which remain in the second dimension of the arr_top array, may be used to map the sorted statistics to the other attributes, stored in a separate data structure, as described above, associated with their respective statistics.

In one example embodiment, a network manager may want to know the features with the most and least network traffic hits at the network element 112. For example, the network manager may want to revoke resources from features having very few network traffic hits to reassign the freed resources to features having significant network traffic hits. In this manner, the network element 112 would not exhaust itself of resources. In one example, the network manager may want to focus on the QoS feature. Therefore, the network manager may sort the statistics in descending order and then filter the statistics so that only QoS features are considered. Such sorting and filtering is enabled because the original indices are still associated with the statistics and allow mapping the statistics to the attributes of the statistics. Sorting the QoS statistics in this manner results in the QoS features having the most network traffic hits. The network manager may then sort in descending order to determine the QoS features having the fewest network traffic hits. The network manager may then determine which of the QoS features having the fewest network traffic hits should have resources revoked and reassigned to one or more of the QoS features having the most network traffic hits.

While the iCAM manager 206 may generate analytical data to analyze the performance of the network 102 and sort and filter the analytical data, it may be difficult for a network manager to easily comprehend how the resources on the network element 112 are being used. A graphical representation of the resource usage may be helpful in this regard.

Figure 5:
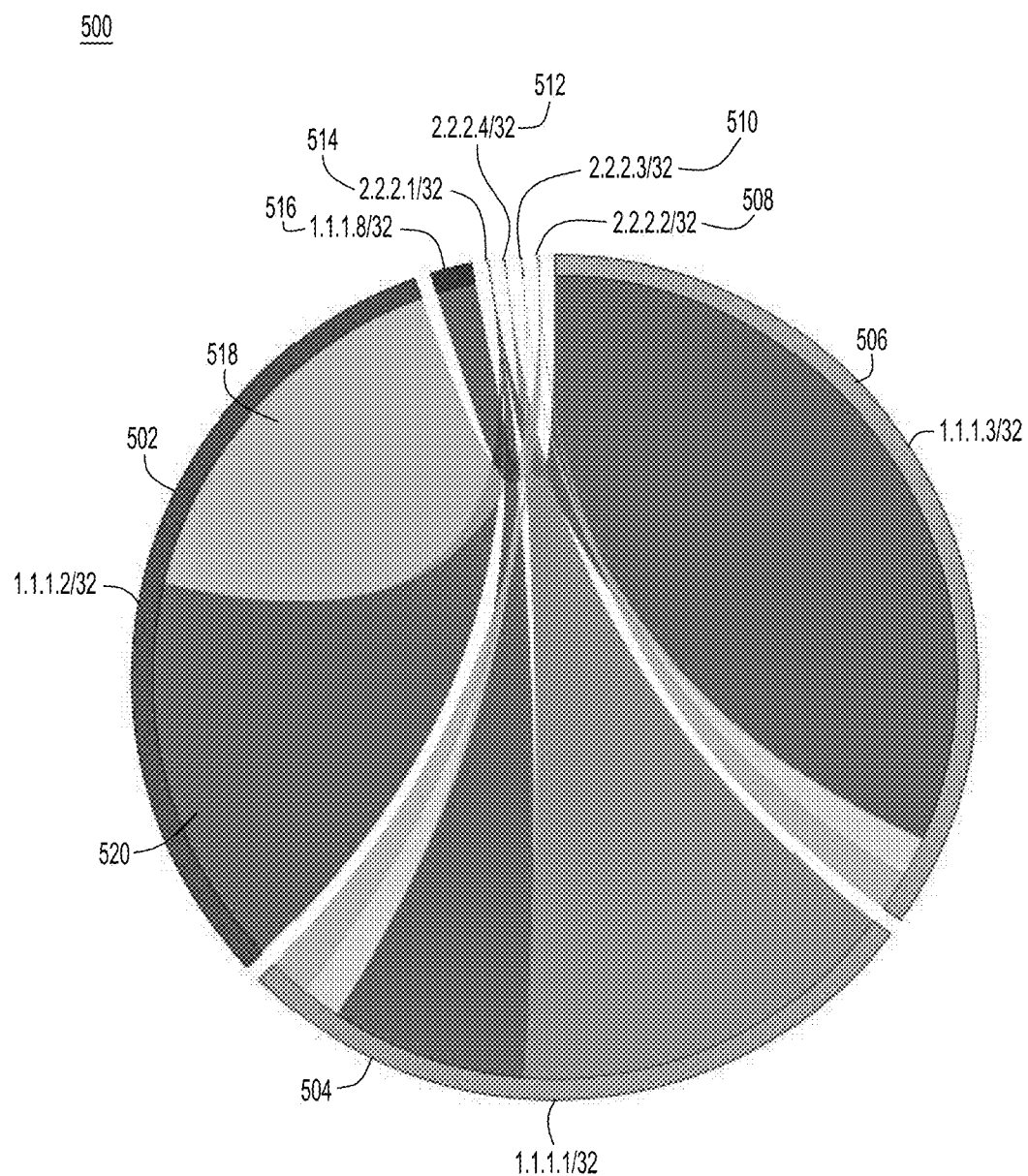
FIG. 5 shows a diagram visually representing a source subnetwork and a destination subnetwork for network traffic in a network, according to an example embodiment.

Turning to FIG. 5, shown is a diagram 500 visually representing source subnetworks and destination subnetworks for network traffic in network 102, according to an example embodiment. The diagram 500 indicates traffic for a plurality of subnetworks (subnets) 502, 504, 506, 508, 510, 512, 514, and 516. The volume of traffic on each of the plurality of subnetworks 502, 504, 506, 508, 510, 512, 514, and 516 is represented by a line segment around the circle (an arc). The length of the line segment/arc is proportional to the volume of traffic passing through the network element 112 for the associated subnetwork. For example, the majority of TCAM resources are being utilized by subnetworks 502, 504, and 506.

Additionally, shown in FIG. 5 are multiple chords extending from one subnetwork to another subnetwork. For example, subnetwork 502 includes chords 518 and 520. Chord 518 has a thick portion at subnetwork 502 and a thin portion at subnetwork 508. The thick portion of chord 518 indicates the source of network traffic while the thin portion of chord 518 indicates the destination of network traffic. Therefore, traffic for chord 518 has a source of subnetwork 502 and a destination of subnetwork 508. The thickness of chord 518 is proportional to a volume of network traffic transmitted from subnetwork 502. A similar description applies for chord 520. A sum of network traffic represented by chords 518 and 520 is equal to the total amount of network traffic transmitted by subnetwork 502.

While FIG. 5 is helpful in determining which subnetworks transmit how much network traffic and which subnetworks are transmitting network traffic to which other subnetworks, it does not show which features are using the most memory resources on the network element 112.

Figure 6A:
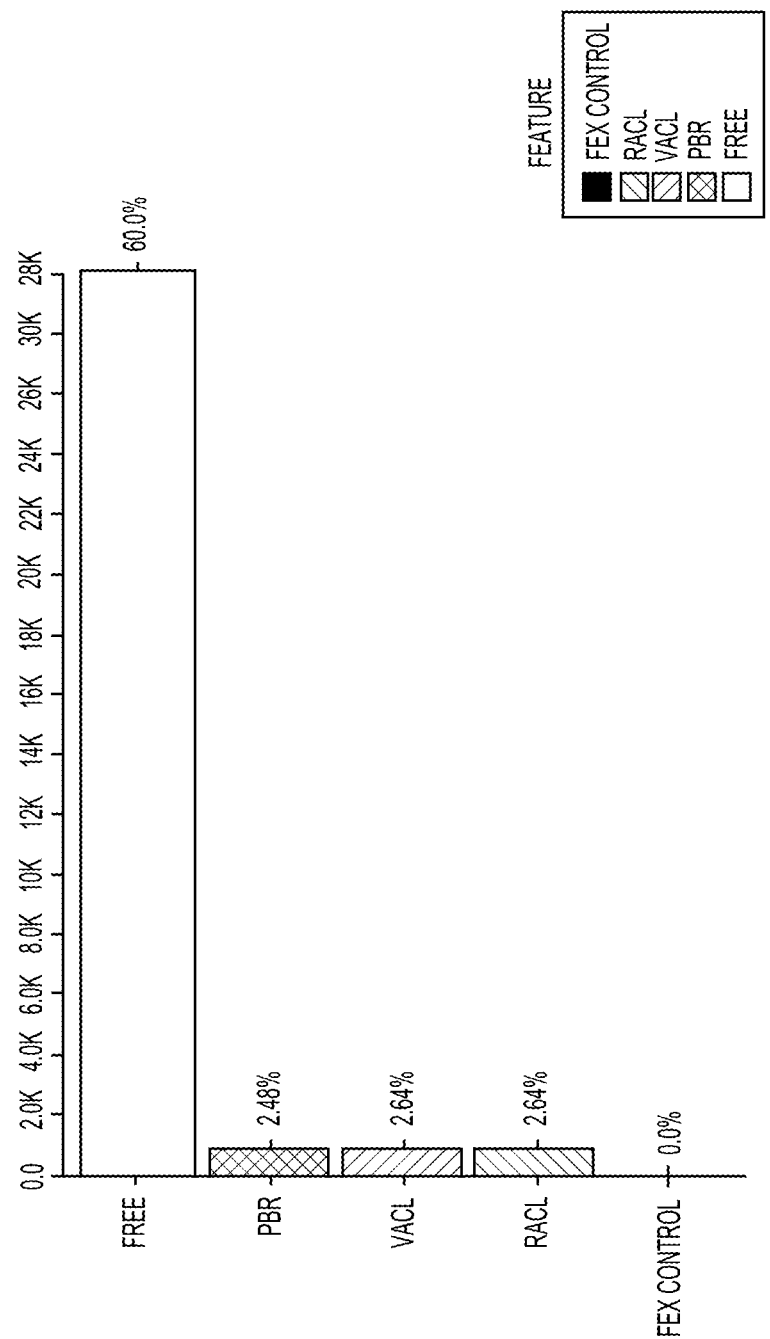
FIGS. 6A and 6B illustrate a bar chart and a pie chart, respectively, showing resource utilization of a networking feature, according to an example embodiment.
Figure 6B:
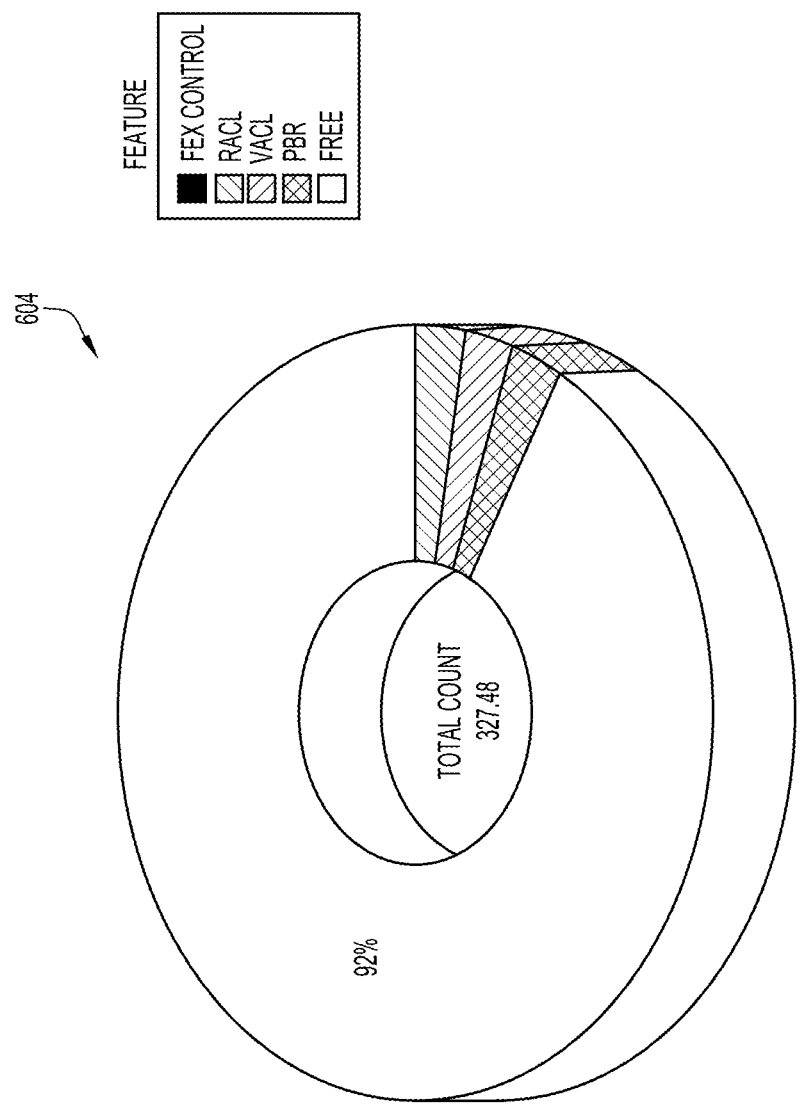

Turning to FIGS. 6A and 6B, shown are a bar chart and a pie chart, respectively, indicating resource utilization by networking feature, according to an example embodiment. As an example, FIGS. 6A and 6B show ACL TCAM feature resource utilization at a given point in time on a network element. Both the bar chart 602 of FIG. 6A and the pie chart 604 of FIG. 6B convey the same information but in different formats. As shown in both charts 602 and 604, most of the hardware resources are free. The utilization for other features is shown by other bars and slices of the pie chart.

Figure 7:
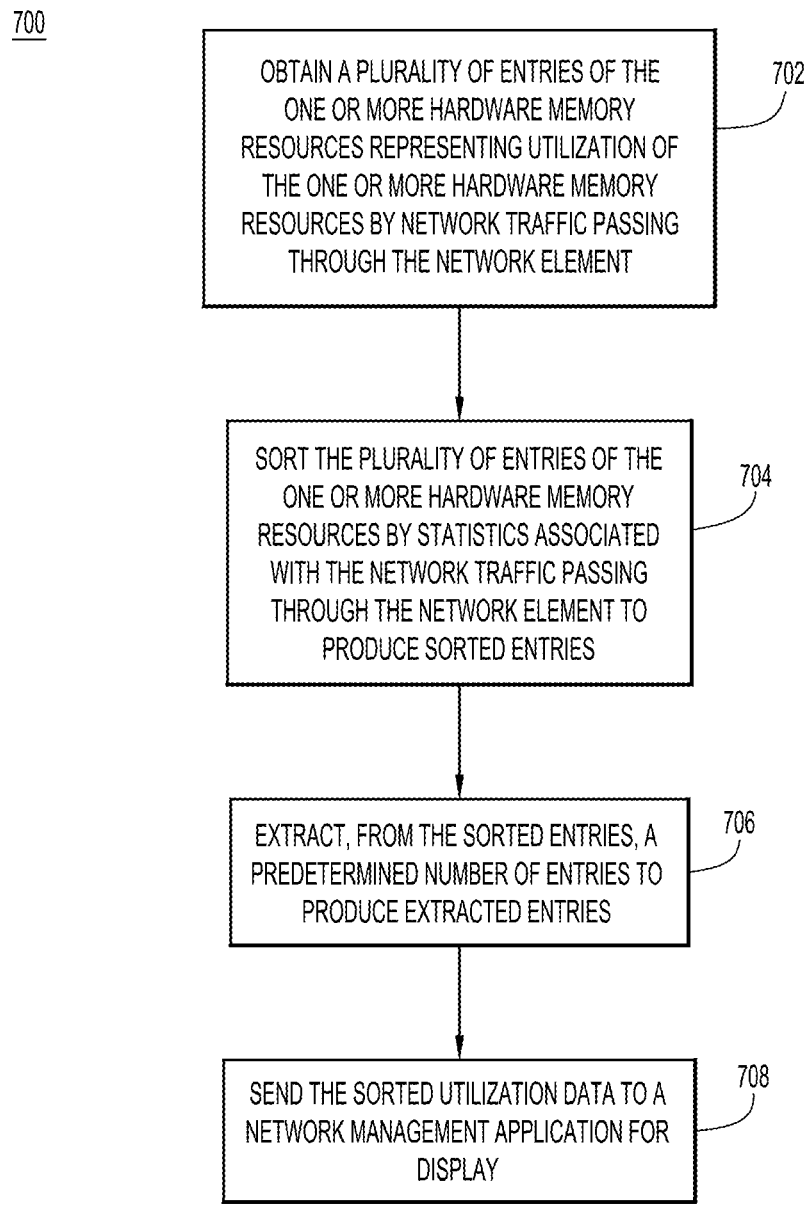
FIG. 7 shows a high level flowchart of a method for sorting and transmitting the sorted utilization data for display, according to an example embodiment.

Turning to FIG. 7, shown is a high-level flowchart of a method 700 for sorting and transmitting the sorted and extracted entries for display, according to an example embodiment. The method 700 may be executed in network element 112, which includes one or more hardware memory resources of fixed storage capacity, such as a TCAM. The one or more hardware memory resources are used to configure a plurality of networking features implemented on network element 112. Method 700 describes the traffic analytics process. The method 700 begins at operation 702. At operation 702, the traffic analytics process obtains a plurality of entries of the one or more hardware memory resources representing utilization of the one or more hardware memory resources by network traffic passing through the network element. For example, the plurality of entries of the one or more hardware memory resources may be the data described above in reference to FIG. 3. After operation 702 is complete, the method 700 proceeds to operation 704.

At operation 704, the traffic analytics process sorts the plurality of entries by a statistics associated with the network traffic passing through the network element. This sorting results in sorted entries. For example, the plurality of entries may be sorted as described above in reference to FIGS. 4A and 4B. The statistics used to sort the entries may include a utilization rate, feature name, class type, value mask, action, and IF index. After operation 704 is complete, the method 700 proceeds to operation 706.

At operation 706, the traffic analytics process extracts, from the sorted entries, a predetermined number of entries to produce extracted entries. For example, the predetermined number of entries may be specified by a user of, for example, the network management application 118. The user may a certain top or bottom percentage of entries, for example. The utilization management process may extract the entries as described above in reference to FIGS. 4A and 4B. After operation 706 is complete, the method 700 proceeds to operation 708.

At operation 708, the traffic analytics process sends the extracted entries to the network management application 118, which displays the extracted entries. As described above, the network management application 118 may be remote from the network element 112. In addition to displaying the extracted entries, the network management application 118 may also display the extracted entries in accordance with the diagram 500 shown in FIG. 5 and the bar and pie charts 602 and 604 shown in FIGS. 6A and 6B. The method 700 then ends.

Turning to FIGS. 8A and 8B, with reference to FIG. 3, shown are sorted and filtered hardware memory resource (e.g., TCAM) utilization data for a network element 112, according to an example embodiment. In this example, the TCAM at module 5, instance 0 is shown. Table 800 in FIG. 8A is similar to the ingress and egress resource utilization data shown in tables 300 and 320 of FIGS. 3A and 3B. Like tables 300 and 320, table 800 in FIG. 8A shows a table with multiple columns/fields, such as networking feature 802, packet type 804, source IP/mask 806, destination IP/mask 808, action 810, IF index 812, and statistics 814. Each row of the table 800 is an entry. In this example, table 800 includes a total of 29 entries. Of those 29 entries, 14 entries are of the RACL feature, 4 entries are of the QoS COPP feature, and 11 entries are the VACL feature. The entries may be sorted by at least one of the columns/fields using the algorithm shown in FIGS. 4A and 4B. For example, in one embodiment, the entries may be sorted by statistics 814. The statistics 814 may be sorted in either ascending or descending order. In table 800, the entries are sorted by statistics 814 in a descending order. The attributes in the other columns/fields remain associated with their respective statistics 814 because of the data structure that includes the other attributes, as described above. For example, because the entries are sorted in a stable manner, the original indices of the entries remain with their entries after the sort. These indices may be mapped to other attributes, such as the columns/fields shown in table 800 and table 850 (shown in FIG. 8B and described below).

Turning to FIG. 8B, shown is a table 850 of sorted entries that have been filtered. Like table 800, table 850 includes multiple columns/fields, such as feature 802, packet type 804, source IP/mask 806, destination IP/mask 808, action 810, IF index 812, and statistics 814. A user may filter the entries by at least one of the columns/fields. For example, a user may be interested in only the RACL feature. Therefore, the user may filter table 800 to display only entries with the RACL feature in descending order by statistics 814, as shown in table 850. In another embodiment, a user may filter the entries before sorting the entries.

One advantage of filtering and sorting the entries is that a user may be able to more efficiently allocate the hardware memory resources. For example, as table 800 shows, the VACL features have no associated statistics 814. However, the VACL feature has hardware memory resources dedicated to it. Therefore, a user may easily determine that some or all of the resources dedicated to VACL entries may be more efficiently utilized by reallocating the resources to, for example, RACL entries.

In summary, in one form, a method is provided including: in a network element that includes one or more hardware memory resources of fixed storage capacity for storing data used to configure a plurality of networking features of the network element and a traffic analytics process running on the network element, the traffic analytics process performing operations including: obtaining a plurality of entries of the one or more hardware memory resources representing utilization of the one or more hardware memory resources by network traffic passing through the network element; sorting the plurality of entries of the one or more hardware memory resources by statistics associated with the network traffic passing through the network element to produce sorted entries; extracting, from the sorted entries, a predetermined number of the entries to produce extracted entries; and sending the extracted entries to a network management application for display is disclosed.

In another aspect, each entry of the plurality of entries is associated with an index value. The sorting step of the method may further include maintaining a correspondence between each entry and the associated index value.

In another embodiment, the maintaining step of the method may also include populating a two-dimensional (2D) array, wherein a first dimension of the 2D array includes the plurality of entries and a second dimension of the 2D array includes the associated index values.

In yet another example embodiment, each entry of the plurality of entries may include one or more features. The method may then filter the plurality of entries by a specified feature and reassign the one or more hardware memory resources that were assigned to a first entry to a second entry.

In yet another aspect, the method may include receiving the extracted entries at the network management application; and generating, from the extracted entries, at the network management application, a circular graphical user interface (GUI) divided into a plurality of segments. Each of the plurality of segments may correspond to an Internet Protocol (IP) subnetwork.

In another example embodiment, a length of each segment is proportional to a utilization of the one or more hardware memory resources by each corresponding IP subnetwork.

In one aspect, the circular graphical user interface further includes a line extending from a first segment to a second segment representing network traffic from a first IP subnetwork associated with the first segment to a second IP subnetwork associated with the second segment. The line has a thickness at the first segment proportional to a volume of network traffic transmitted from the first IP subnetwork to the second IP subnetwork.

In another embodiment, the method may further include populating a first array with the plurality of entries and their associated index values. The first array may then be sorted such that the plurality of entries satisfy heap properties to produce a sorted first array. The method may then populate a second array with the predetermined number of entries and their associated index values from the sorted first array.

In another aspect, the data in the second array are the extracted entries sent to the network management application for display.

In another embodiment, the predetermined number of entries is one of a top predetermined number of entries or a bottom predetermined number of entries.

In another example embodiment, an apparatus is provided including a communication interface configured to enable network communications; a processor coupled with the communication interface and configured to: obtain a plurality of entries of the one or more hardware memory resources representing utilization of the one or more hardware memory resources by network traffic passing through the network element; sort the plurality of entries of the one or more hardware memory resources by statistics associated with the network traffic passing through the network element to produce sorted entries; extract, from the sorted entries, a predetermined number of the entries to produce extracted entries; and send the extracted entries to a network management application for display is disclosed.

In yet another form, one or more non-transitory computer readable storage media are provided encoded with instructions that, when executed by a processor, cause the processor to: obtain a plurality of entries of the one or more hardware memory resources representing utilization of the one or more hardware memory resources by network traffic passing through the network element; sort the plurality of entries of the one or more hardware memory resources by statistics associated with the network traffic passing through the network element to produce sorted entries; extract, from the sorted entries, a predetermined number of the entries to produce extracted entries; and send the extracted entries to a network management application for display is disclosed.

Figure 9:
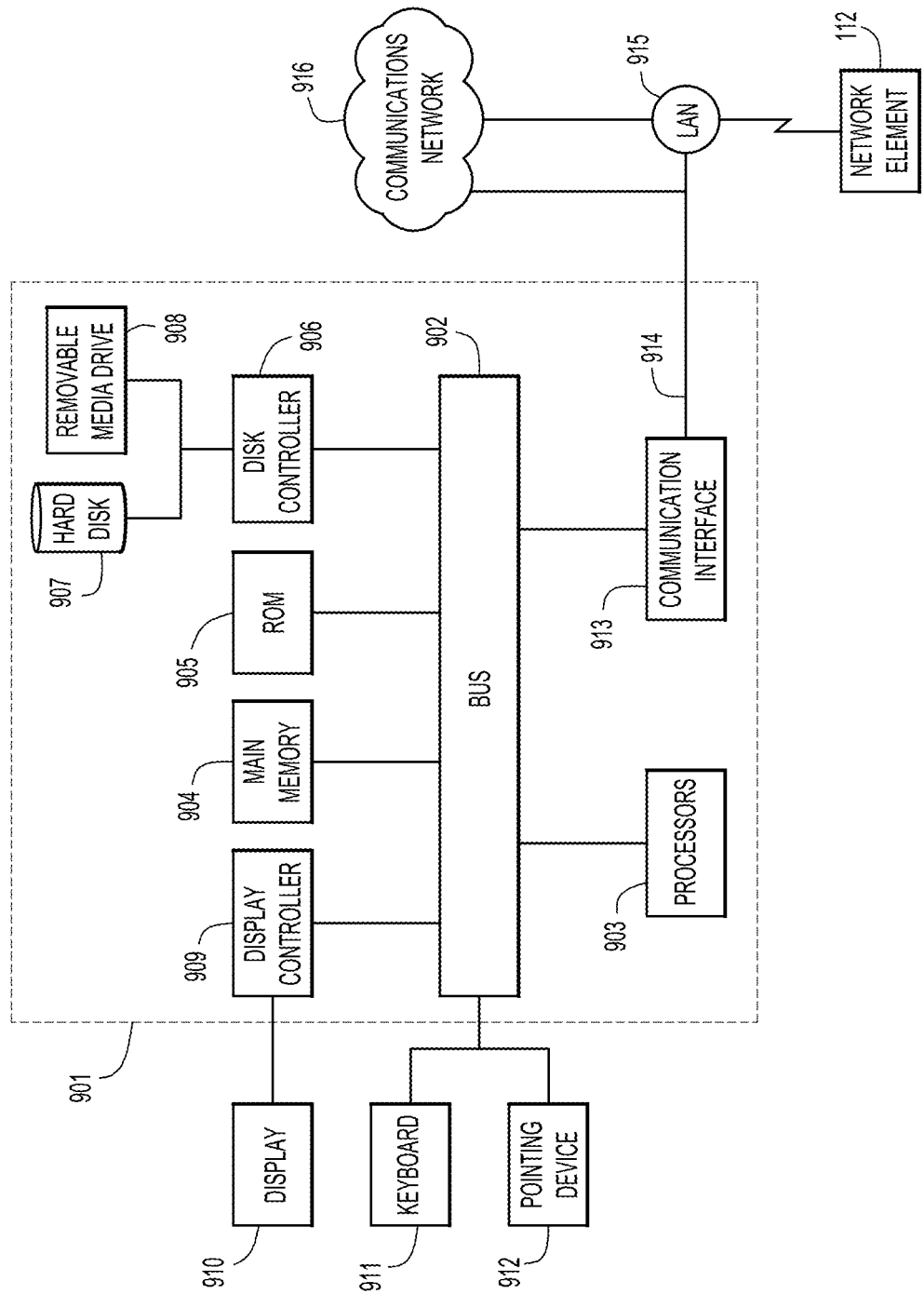
FIG. 9 shows a block diagram of an apparatus on which a network management application is configured to perform the analytics display techniques, according to an example embodiment.

Turning to FIG. 9, shown is a block diagram of a computing device/system, e.g., electronic device 106 shown in FIG. 1, configured to execute the network management application 118, according to an example embodiment. FIG. 9 illustrates a computer system 901 upon which the embodiments presented may be implemented. The computer system 901 includes a bus 902 or other communication mechanism for communicating information, and a processor 903 coupled with the bus 902 for processing the information. While the figure shows a single block 903 for a processor, it should be understood that the processors 903 represent a plurality of processing cores, each of which can perform separate processing. The computer system 901 also includes a main memory 904, such as a random access memory (RAM) or other dynamic storage device (e.g., dynamic RAM (DRAM), static RAM (SRAM), and synchronous DRAM (SD RAM)), coupled to the bus 902 for storing information and instructions to be executed by processor 903. In addition, the main memory 904 may be used for storing temporary variables or other intermediate information during the execution of instructions by the processor 903.

The computer system 901 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 901 may also include a display controller 909 coupled to the bus 902 to control a display 910, such as a cathode ray tube (CRT), for displaying information to a computer user. The computer system 901 includes input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910.

The computer system 901 performs a portion or all of the processing steps of the process in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 901, for driving a device or devices for implementing the process, and for enabling the computer system 901 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 901 also includes a communication interface 913 coupled to the bus 902. The communication interface 913 provides a two-way data communication coupling to a network link 914 that is connected to, for example, a local area network (LAN) 915, or to another communications network 102 such as the Internet. For example, the communication interface 913 may be a wired or wireless network interface card to attach to any packet switched (wired or wireless) LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local area network 915 (e.g., a LAN) or through equipment operated by a service provider, which provides communication services through a communications network 102. The local network 914 and the communications network 102 use, for example, electrical, electromagnetic, or optical signals that carry digital data streams, and the associated physical layer (e.g., CAT 5 cable, coaxial cable, optical fiber, etc.). The signals through the various networks and the signals on the network link 914 and through the communication interface 913, which carry the digital data to and from the computer system 801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a cloud computing network 104.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   in a network element that includes one or more hardware memory resources of fixed storage capacity for storing data used to configure a plurality of networking features of the network element and a utilization management process running on the network element, the utilization management process performing operations including:
   obtaining a plurality of entries of the one or more hardware memory resources representing utilization of the one or more hardware memory resources by network traffic passing through the network element;
   sorting the plurality of entries of the one or more hardware memory resources by statistics associated with the network traffic passing through the network element to produce sorted entries;
   extracting, from the sorted entries, a predetermined number of the entries to produce extracted entries; and
   sending the extracted entries to a network management application for display.

2. The method of claim 1, wherein each entry of the plurality of entries is associated with an index value, wherein the sorting further comprises:
   maintaining a correspondence between each entry and the associated index value.

3. The method of claim 2, wherein the maintaining further comprises:
   populating a two-dimensional (2D) array, wherein a first dimension of the 2D array includes the plurality of entries and a second dimension of the 2D array includes the associated index values.

4. The method of claim 1, wherein each entry of the plurality of entries includes one or more of the plurality of networking features, the method further comprising:
   filtering the plurality of entries by a specified networking feature; and
   reassigning the one or more hardware memory resources that were assigned to a first entry to a second entry.

5. The method of claim 1, further comprising:
   receiving the extracted entries at the network management application; and
   generating from the extracted entries, at the network management application, a circular graphical user interface (GUI) divided into a plurality of segments, wherein each of the plurality of segments corresponds to an Internet Protocol (IP) subnetwork.

6. The method of claim 5, wherein a length of each segment is proportional to a utilization of the one or more hardware memory resources by each corresponding IP subnetwork.

7. The method of claim 6, wherein the circular graphical user interface further comprises a line extending from a first segment to a second segment representing network traffic from a first IP subnetwork associated with the first segment to a second IP subnetwork associated with the second segment, wherein the line has a thickness at the first segment proportional to a volume of network traffic transmitted from the first IP subnetwork to the second IP subnetwork.

8. The method of claim 2, wherein the sorting further comprises:
   populating a first array with the plurality of entries and their associated index values; and
   sorting the first array so that the plurality of entries satisfy heap properties to produce a sorted first array,
   wherein the extracting further comprises:
   populating a second array with the predetermined number of the entries and their associated index values from the sorted first array.

9. The method of claim 8, wherein the entries in the second array are the extracted entries sent to the network management application for display.

10. The method of claim 1, wherein the predetermined number of the entries is one of a top predetermined number of the entries or a bottom predetermined number of the entries.

11. An apparatus comprising:
    a communication interface configured to enable network communications;
    one or more hardware memory resources;
    a processor coupled with the communication interface, the processor configured to:
    obtain a plurality of entries of the one or more hardware memory resources representing utilization of the one or more hardware memory resources by network traffic passing through the apparatus;

sort the plurality of entries of the one or more hardware memory resources by statistics associated with the network traffic passing through the apparatus to produce sorted entries;

extract, from the sorted entries, a predetermined number of the entries to produce extracted entries; and send the extracted entries to a network management application for display.

12. The apparatus of claim 11, wherein each entry of the plurality of entries is associated with an index value, wherein the processor is further configured to:

maintain a correspondence between each entry and the associated index value.

13. The apparatus of claim 12, wherein the processor is further configured to:

populate a two-dimensional (2D) array, wherein a first dimension of the 2D array includes the plurality of entries and a second dimension of the 2D array includes the associated index values.

14. The apparatus of claim 11, wherein each of the plurality of entries includes one or more features, wherein the processor is further configured to:

filter the plurality of entries by a specified feature; and reassign the one or more hardware memory resources that were assigned to a first entry to a second entry.

15. The apparatus of claim 11, wherein the processor is further configured to:

populate a first array with the plurality of entries and their associated index values;

sort the first array so that the plurality of entries satisfy heap properties to produce a sorted first array; and populate a second array with the predetermined number of the entries and their associated index values from the sorted first array.

16. A system comprising the apparatus of claim 11, and further comprising a computing device configured to execute instructions for the network management application, wherein the computing device is configured to generate from the extracted entries a circular graphical user interface (GUI) divided into a plurality of segments, wherein each of the plurality of segments corresponds to an Internet Protocol (IP) subnetwork.

17. One or more non-transitory computer readable storage media encoded with instructions that, when executed by a processor in a network element, cause the processor to:

obtain a plurality of entries of one or more hardware memory resources of the network element representing utilization of the one or more hardware memory resources by network traffic passing through the network element;

sort the plurality of entries of the one or more hardware memory resources by statistics associated with the network traffic passing through the network element to produce sorted entries;

extract, from the sorted entries, a predetermined number of the entries to produce extracted entries; and send the extracted entries to a network management application for display.

18. The one or more non-transitory computer readable storage media of claim 17, wherein each entry of the plurality of entries is associated with an index value, wherein the instructions further cause the processor to:

maintain a correspondence between each entry and the associated index value.

19. The one or more non-transitory computer readable storage media of claim 18, wherein the instructions further cause the processor to:

populate a two-dimensional (2D) array, wherein a first dimension of the 2D array includes the plurality of entries and a second dimension of the 2D array includes the associated index values.

20. The one or more non-transitory computer readable storage media of claim 17, wherein the instructions further cause the processor to:

populate a first array with the plurality of entries and their associated index values;

sort the first array so that the plurality of entries satisfy heap properties to produce a sorted first array; and populate a second array with the predetermined number of the entries and their associated index values from the sorted first array.

* * * * *